(12) United States Patent
Abe et al.

(10) Patent No.: US 12,215,838 B2
(45) Date of Patent: Feb. 4, 2025

(54) LIGHTING TOOL FOR VEHICLE (71) Applicant: STANLEY ELECTRIC CO., LTD., Tokyo (JP)

(72) Inventors: Kazuki Abe, Tokyo (JP); Norifumi Imazeki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/604,054

(22) Filed: Mar. 13, 2024

(65) Prior Publication Data

US 2024/0310019 A1 Sep. 19, 2024

(30) Foreign Application Priority Data

Mar. 16, 2023 (JP) .................................. 2023-042053

(51) Int. Cl.
*F21S 43/237* (2018.01)
*F21S 43/247* (2018.01)
*F21S 43/31* (2018.01)
*B60Q 1/44* (2006.01)

(52) U.S. Cl.
CPC .......... *F21S 43/247* (2018.01); *F21S 43/237* (2018.01); *F21S 43/31* (2018.01); *B60Q 1/44* (2013.01)

(58) Field of Classification Search
CPC .... F21S 43/2492; F21S 43/249; F21S 43/237; F21S 43/246; F21S 43/253; B60Q 1/44
See application file for complete search history.

(56) References Cited

U.S. PATENT DOCUMENTS 11,015,779 B2 * 5/2021 Sakashita ............... F21S 43/237
2016/0341392 A1 * 11/2016 Zelikovskaya ......... F21S 43/50

FOREIGN PATENT DOCUMENTS

EP 3671019 A1 * 6/2020 ........... B60Q 1/0058
JP 2014-220195 A 11/2014

* cited by examiner

*Primary Examiner* — Robert J May
(74) *Attorney, Agent, or Firm* — KENEALY VAIDYA LLP (57) ABSTRACT

A lighting tool for a vehicle includes a first light source and a second light source, a first-light-guide-body that guides first light emitted from the first light source, and a second-light-guide-body that guides second light emitted from the second light source, the first-light-guide-body has a rod-shaped first light guide part, a first incidence part located on a base end side of the first light guide part, and a branch emission part that emits some of first light, which is guided in the first light guide part, to an outside of the first light guide part, and the second-light-guide-body has a rod-shaped second light guide part, a second incidence part located on a base end side of the second light guide part, and a branch incidence part that causes first light, which is emitted from the branch emission part, to enter the second light guide part.

9 Claims, 7 Drawing Sheets

LIGHTING TOOL FOR VEHICLE

CROSS-REFERENCE TO RELATED APPLICATION

Priority is claimed on Japanese Patent Application No. 2023-042053, filed Mar. 16, 2023, the content of which is incorporated herein by reference.

BACKGROUND OF THE INVENTION

Field of the Invention

The present invention relates to a lighting tool for a vehicle.

Description of Related Art

In the related art, as a lighting tool for a vehicle mounted on a vehicle, a configuration in which a light source such as a light emitting diode (LED) or the like and a rod-shaped light guide body (light guide rod) are assembled is known (for example, see Japanese Unexamined Patent Application, First Publication No. 2014-220195).

In such a lighting tool for a vehicle, light emitted from the light source enters the light guide body from an incidence surface provided on a base end side of the light guide body, and the light is guided toward a tip side of the light guide body while repeating reflection in the light guide body. In addition, light reflected by a plurality of reflection cuts provided on a back surface side of the light guide body is emitted from the front surface side of the light guide body to the outside of the light guide body. Accordingly, it is possible to emit light from the light emitting surface provided on the front surface side of the light guide body.

In addition, in the lighting tool for a vehicle, in a rear combination lamp in which a tail lamp and a brake lamp are configured by separate light emitting surfaces, in order to suppress luminance irregularity of the light emitting surface, light passes through a space between the neighboring light guide bodies that form the light emitting surfaces, respectively (for example, see Japanese Unexamined Patent Application, First Publication No. 2014-220195).

SUMMARY OF THE INVENTION

Incidentally, in the lighting tool for a vehicle including the above-mentioned light guide body, in order to satisfy a legal light emitting area of the brake lamp, when the brake lamp is turned on, the tail lamp is also turned on at the same time, making it part of the brake lamp.

However, in the configuration in which some of the light is guided from the above-mentioned one light guide body to the other light guide body, when only the tail lamp is turned on, since some of the light is guided to the light guide body on the brake lamp side, the tail lamp and the brake lamp are turned on at the same time, causing an unintended light emitting surface to emit light, resulting in poor appearance when turned on.

An aspect of the present invention is directed to providing a lighting tool for a vehicle capable of guiding some light from only one side and improving appearance when turned on in a configuration in which some light is guided from one light guide body to the other light guide body.

An aspect of the present invention provides the following configurations.

(1) A lighting tool for a vehicle according to an aspect of the present invention includes: a first light source and a second light source; a first light guide body configured to guide first light emitted from the first light source; and a second light guide body configured to guide second light emitted from the second light source,
the first light guide body having a rod-shaped first light guide part, a first incidence part and a branch emission part, the first incidence part being located on a base end side of the first light guide part and being configured to cause the first light emitted from the first light source to enter the first light guide part, the branch emission part being configured to emit some of the first light, which is guided in the first light guide part, to an outside of the first light guide part, and
the second light guide body having a rod-shaped second light guide part, a second incidence part and a branch incidence part, the second incidence part being located on a base end side of the second light guide part and being configured to cause the second light emitted from the second light source to enter the second light guide part, the branch incidence part being configured to cause the first light, which is emitted from the branch emission part, to enter the second light guide part.

(2) In the lighting tool for a vehicle of the aspect of the above-mentioned (1), the first light guide body has a first branch part branched off from the first light guide part toward a tip side of the second light guide part, and
the branch emission part is located on a tip side of the first branch part.

(3) In the lighting tool for a vehicle of the aspect of the above-mentioned (1), the second light guide body has a second branch part branched off from the second light guide part toward a base end side of the first light guide part, and
the branch incidence part is located on a tip side of the second branch part.

(4) In the lighting tool for a vehicle of the aspect of the above-mentioned (1), the branch emission part and the branch incidence part are disposed to face each other.

(5) In the lighting tool for a vehicle of the aspect of the above-mentioned (1), the first light source and the second light source are provided on a same surface of a same substrate, and emit the first light and the second light in the same direction.

(6) The lighting tool for a vehicle of the aspect of the above-mentioned (5) includes a shielding member that is provided between the first light source and the second light source and that is configured to shield light between the first light source and the second light source.

(7) In the lighting tool for a vehicle of the aspect of the above-mentioned (1), the first light guide body has a first reflection part and a first emission part, the first reflection part being located on a back surface side of the first light guide part and being configured to reflect first light, which is guided toward the tip side of the first light guide part, toward a front surface side of the first light guide part, the first emission part being located on the front surface side of the first light guide part and being configured to emit the first light reflected by the first reflection part to the outside of the first light guide part,
wherein the second light guide body has a second reflection part and a second emission part, the second reflection part being located on a back surface side of the second light guide part and being configured to reflect second light, which is guided toward a tip side of the second light guide part, toward a front surface side of the second light guide part, the second emission part being located on the front surface side of the second light guide part and being configured to emit the second light reflected by the second reflection part to an outside of the second light guide part, and wherein the first light that has entered the second light guide body from the branch incidence part is reflected by the second reflection part and then emitted from the second emission part to the outside of the second light guide part.

(8) In the lighting tool for a vehicle of the aspect of the above-mentioned (7), a state in which red light is emitted from the first emission part and the second emission part as a tail lamp by turning on the second light source is switched to a state in which red light is emitted from the first emission part and the second emission part as a stop lamp by turning on the first light source.

(9) In the lighting tool for a vehicle of the aspect of the above-mentioned (7), a state in which red light is emitted from the second emission part as a tail lamp by turning on the second light source is switched to a state in which red light is emitted from the first emission part and the second emission part as a stop lamp by turning on the first light source and the second light source.

According to the aspect of the present invention, the lighting tool for a vehicle capable of guiding some light from only one side and improving appearance when the lighting tool is turned on in a configuration in which some light is guided from one light guide body to the other light guide body is provided.

BRIEF DESCRIPTION OF THE DRAWINGS

FIG. 4 is a schematic view showing an optical path of first light when the tail lamp is turned on.

FIG. 5 is a schematic view showing an optical path of second light when the brake lamp is turned on.

DETAILED DESCRIPTION OF THE INVENTION

Hereinafter, an embodiment of the present invention will be described in detail with reference to the accompanying drawings.

Further, in the drawings used in the following description, dimensions may be shown at different scales depending on components in order to make each component easier to see, and a dimensional ratio of each component may not be the same as in reality.

Figure 1:
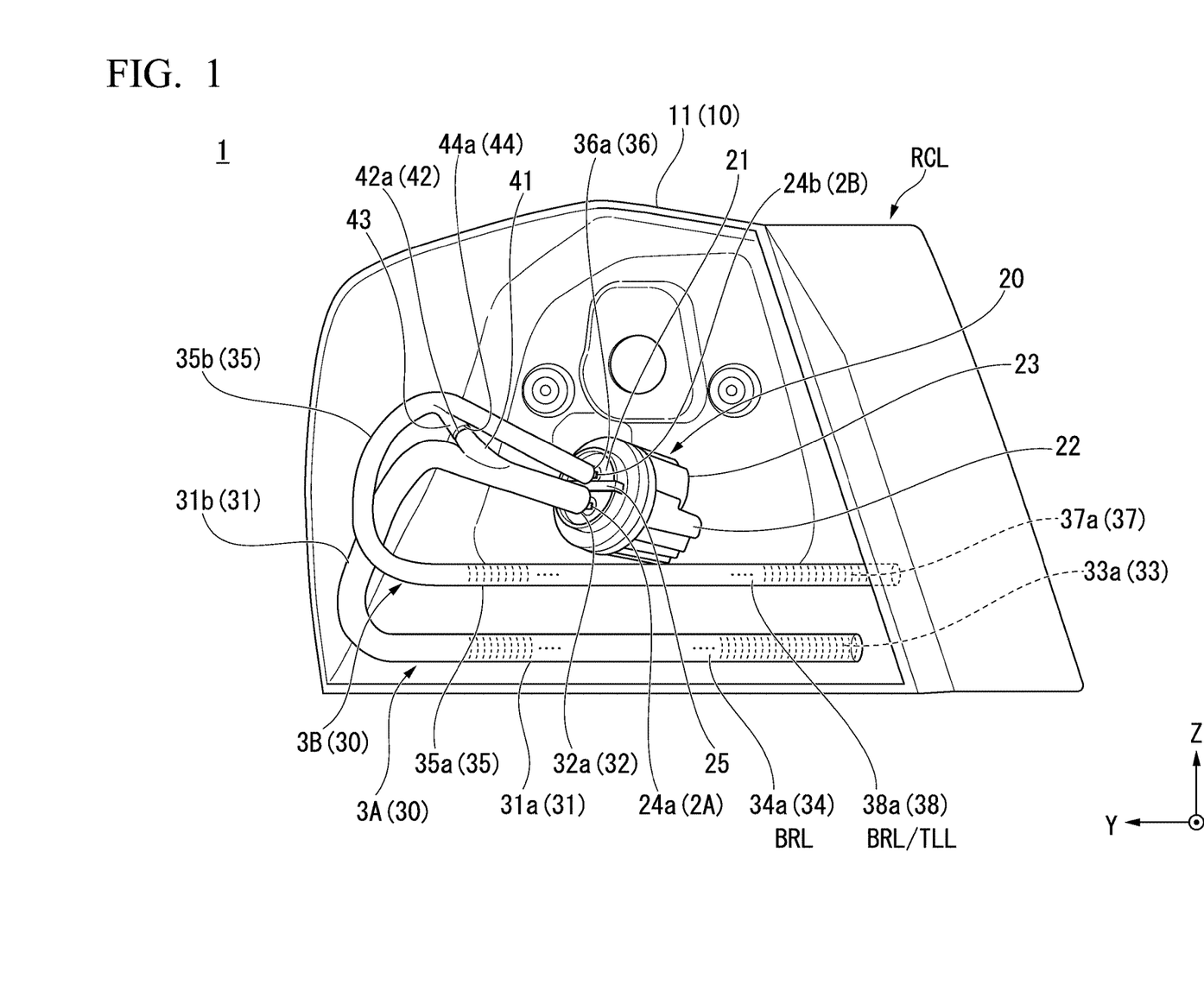
FIG. 1 is a front view showing a configuration of a tail lamp and a brake lamp provided in a lighting tool for a vehicle according to an embodiment of the present invention.
Figure 2:
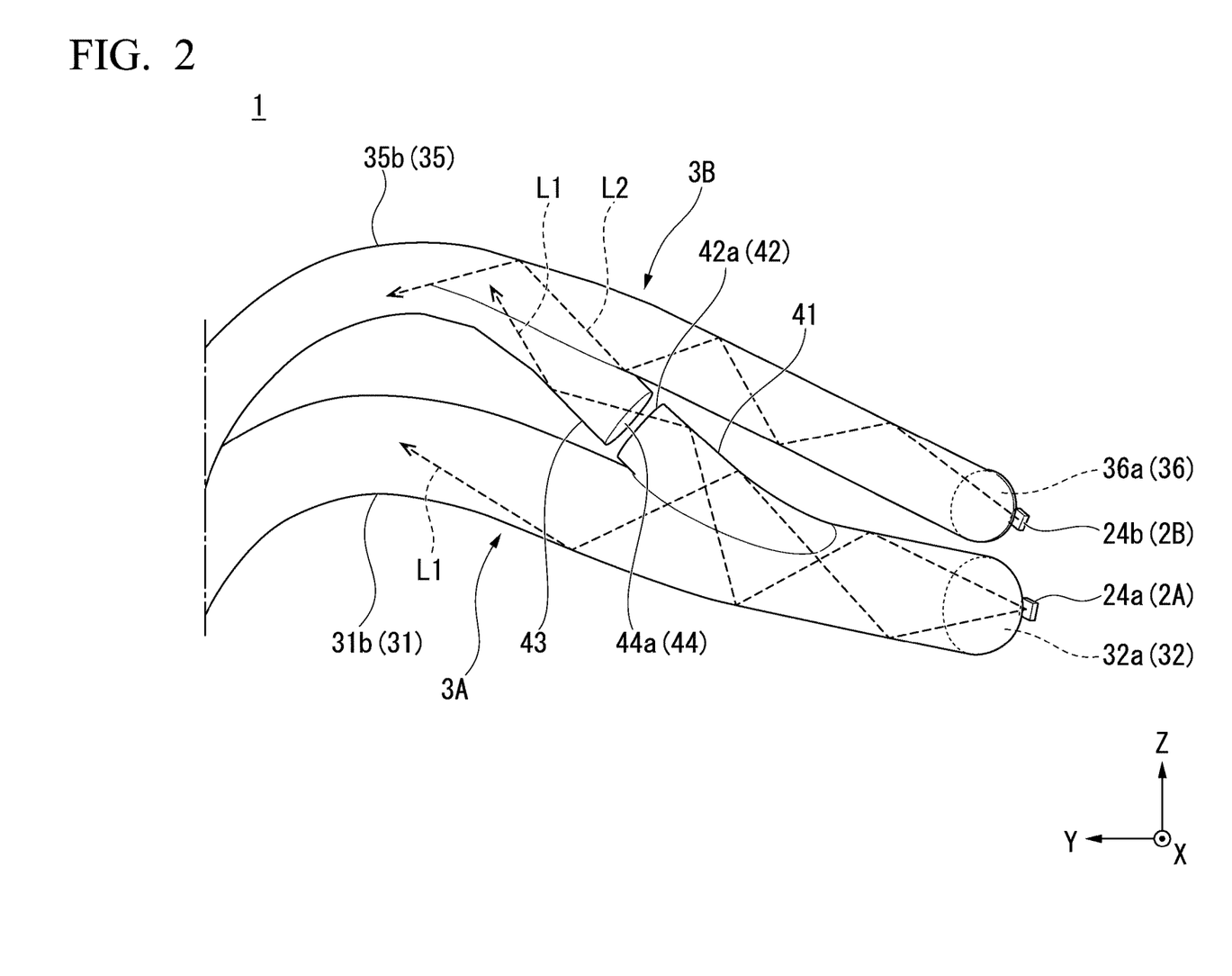
FIG. 2 is an enlarged perspective view of major parts of a first light guide body and a second light guide body that constitute the tail lamp and the brake lamp.
Figure 3:
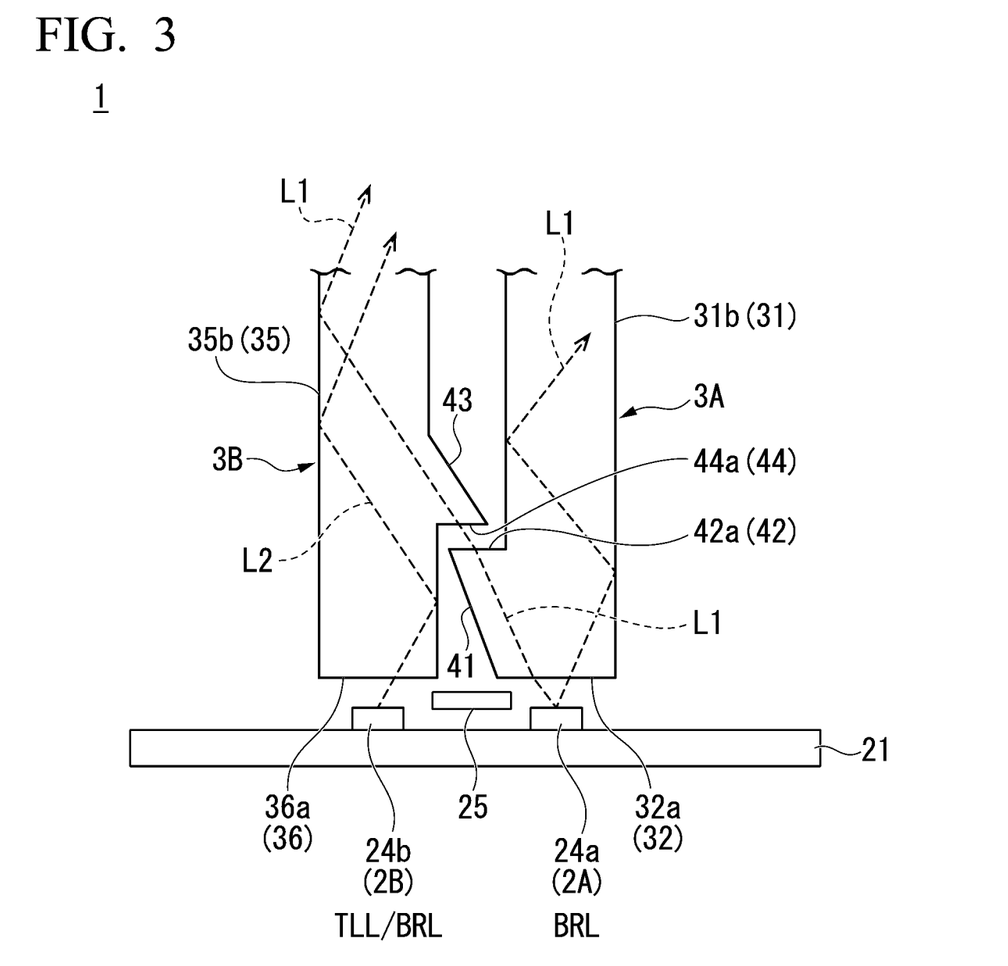
FIG. 3 is a schematic view showing a configuration of the tail lamp and the brake lamp.
Figure 4:
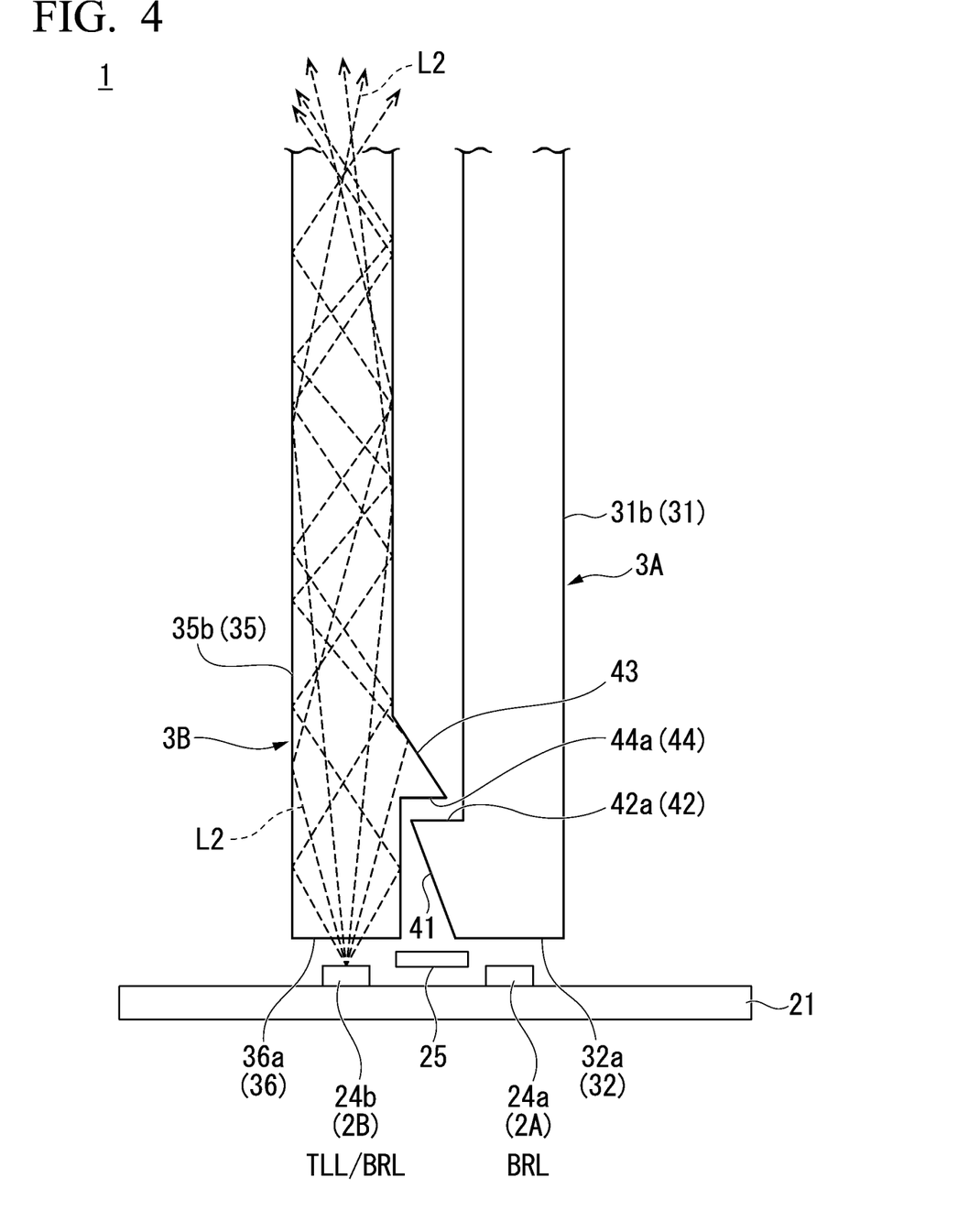
Figure 5:
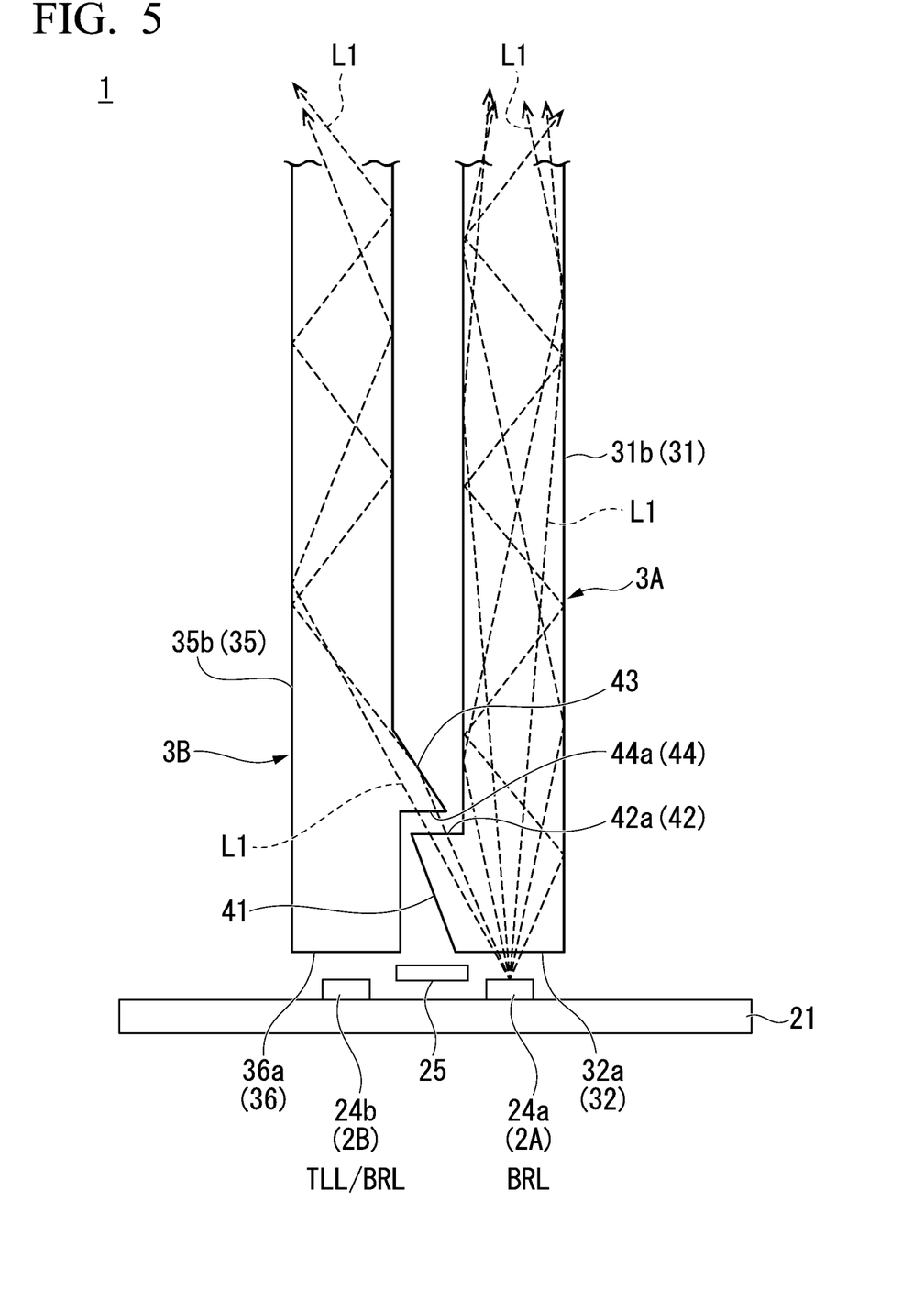
Figure 6:
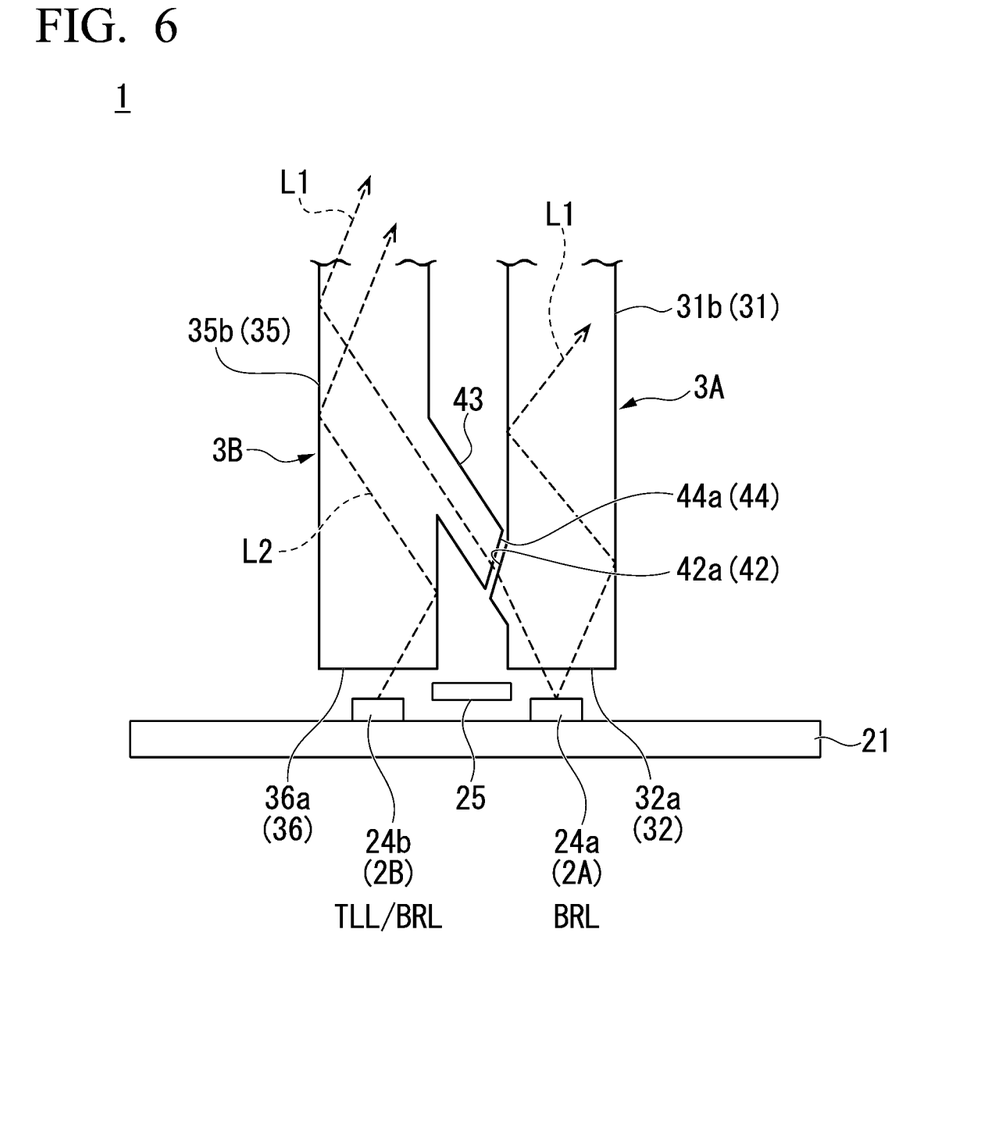
FIG. 6 is a schematic view showing a variant of the tail lamp and the brake lamp.
Figure 7:
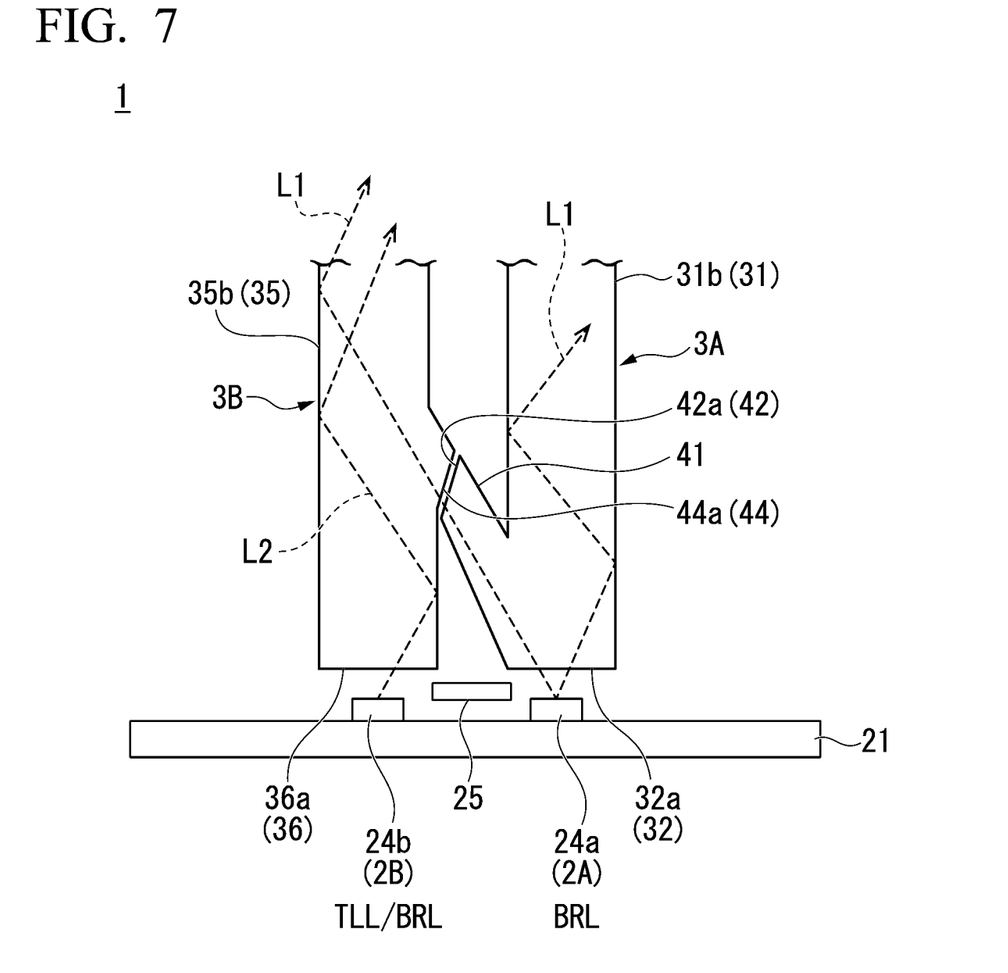
FIG. 7 is a schematic view showing a variant of the tail lamp and the brake lamp.

As an embodiment of the present invention, for example, a lighting tool for a vehicle 1 shown in FIG. 1 to FIG. 7 will be described. Further, FIG. 1 is a front view showing a configuration of a tail lamp TLL and a brake lamp BRL provided in the lighting tool for a vehicle 1. FIG. 2 is an enlarged perspective view of major parts of a first light guide body and a second light guide body that constitute the tail lamp TLL and the brake lamp BRL. FIG. 3 is a schematic view showing a configuration of the tail lamp TLL and the brake lamp BRL. FIG. 4 is a schematic view showing an optical path of first light L1 when the tail lamp TLL is turned on. FIG. 5 is a schematic view showing an optical path of second light L2 when the brake lamp BRL is turned on. FIG. 6 is a schematic view showing a variant of the tail lamp TLL and the brake lamp BRL. FIG. 7 is a schematic view showing a variant of the tail lamp TLL and the brake lamp BRL.

In addition, in the drawings described below, an XYZ orthogonal coordinate system is set, an X-axis direction indicates a forward/rearward direction (lengthwise direction) of the lighting tool for a vehicle 1, a Y-axis direction indicates a rightward/leftward direction (widthwise direction) of the lighting tool for a vehicle 1, and a Z-axis direction indicates an upward/downward direction (height direction) of the lighting tool for a vehicle 1.

As shown in FIG. 1, the lighting tool for a vehicle 1 of the embodiment configures the tail lamp TLL and the brake lamp BRL in rear combination lamps RCL mounted on both corner portions on a rear end side (a corner portion on a left rear end side in the embodiment) of a vehicle (not shown).

Further, in the following description, the terms "forward," "rearward," "leftward," "rightward," "upward" and "downward" refer to directions of the lighting tool for a vehicle 1 viewed from a front face (the rear of the vehicle) unless the context indicates otherwise. Accordingly, the respective directions when the vehicle is viewed from its front face (the front of the vehicle) are the directions in which the forward, rearward, leftward, and rightward directions are reversed.

Specifically, the lighting tool for a vehicle 1 has a lighting body 10, a light source unit 20 disposed inside the lighting body 10 and including a first light source 2A and a second light source 2B, and a light guide part 30 including a first light guide body 3A and a second light guide body 3B, which are rod-shaped.

The lighting body 10 is constituted by a housing 11 with a front face (front surface) open, and a transparent outer lens (not shown) configured to cover the opening of the housing 11. In addition, the lighting body 10 has a shape curved from a central portion toward both end portions in a vehicle width direction according to a slant shape provided on both corner portions on the rear end side of the vehicle. Further, the shape of the lighting body 10 is not limited to such a curved shape and may be appropriately changed according to a design or the like of the vehicle.

The light source unit 20 constitutes a socket with an exchangeable (attachable) coupler, and can be detachably attached to surroundings of an attachment hole (not shown) in a state in which a front face (front surface) thereof is inserted into the lighting body 10 from the attachment hole provided on the back surface (rear surface) side of the housing 11 (the lighting body 10).

The light source unit 20 has the first light source 2A and the second light source 2B, which are adjacent to each other, a circuit board 21 on which the first light source 2A and the second light source 2B are mounted, a heat sink 22 thermally connected to the circuit board 21, and a connector portion 23 electrically connected to the circuit board 21.

The first light source 2A and the second light source 2B have at least one or a plurality of (in the embodiment, one for each of the light sources 2A and 2B) light emitting elements 24a and 24b configured to emit red light (hereinafter, referred to as "light") L1 and L2, respectively.

The light emitting elements 24*a* and 24*b* are constituted by, for example, LEDs, mounted on a surface of the circuit board 21 on which a driving circuit (not shown) configured to drive the LEDs is provided, and radially emit the light L1 and L2 toward the front surface side. That is, the first light source 2A and the second light source 2B are provided on the same surface of the same circuit board 21 and emit the light L1 and L2 in the same direction.

In addition, in the plurality of light emitting elements 24*a* and 24*b*, the first light emitting element 24*a* that constitutes the first light source 2A emits the first light L1, and the second light emitting element 24*b* that constitutes the second light source 2B emits the second light L2.

As shown in FIG. 1, FIG. 2 and FIG. 3, the light guide part 30 has the first light guide body 3A configured to guide the first light L1 emitted from the first light source 2A, and the second light guide body 3B configured to guide the second light L2 emitted from the second light source 2B.

The first light guide body 3A and the second light guide body 3B are constituted by an elongated rod-shaped light transmitting member, for example, a transparent resin such as polycarbonate, acryl, or the like, glass, or the like. In addition, the first light guide body 3A and the second light guide body 3B have a cross-sectional shape based on an outline of a single circle in a cross section in a direction perpendicular to the axial direction (hereinafter, referred to as "a vertical cross section").

The first light guide body 3A has a first light guide part 31 which is rod-shaped as a whole, a first incidence part 32 located on a base end side of the first light guide part 31, a first reflection part 33 located on a back surface side of the first light guide part 31, and a first emission part 34 located on a front surface side of the first light guide part 31.

The second light guide body 3B has a second light guide part 35 which is rod-shaped as a whole, a second incidence part 36 located on a base end side of the second light guide part 35, a second reflection part 37 located on a back surface side of the second light guide part 35, and a second emission part 38 located on a front surface side of the second light guide part 35.

The first light guide part 31 has a first extension part 31*a* on which the first reflection part 33 and the first emission part 34 are provided, and a first curved part 31*b* curved between the first extension part 31*a* and the first incidence part 32.

In addition, in the first light guide part 31, the first extension part 31*a* constitutes a light emission part that emits light due to the first light L1, and the first curved part 31*b* constitutes a support running part that does not emit light due to the first light L1. Further, the support running part is not particularly limited to the curved shape like the first curved part 31*b*.

The second light guide part 35 has a second extension part 35*a* on which the second reflection part 37 and the second emission part 38 are provided, and a second curved part 35*b* curved between the second extension part 35*a* and the second incidence part 36.

In addition, in the second light guide part 35, the second extension part 35*a* constitutes a light emission part that emits light due to the second light L2, and the second curved part 35*b* constitutes a support running part that does not emit light due to the second light L2. Further, the support running part is not particularly limited to the curved shape like the second curved part 35*b*.

The first and second extension parts 31*a* and 35*a* extend in the vehicle width direction while being parallel to each other, and have a shape curved in a direction in which an outer side recedes more than an inner side in the vehicle width direction according to the slant shape provided on both corner portions on the rear end side of the vehicle. Further, in the embodiment, the second extension part 35*a* is located above the first extension part 31*a*.

The first and second curved parts 31*b* and 35*b* have a shape curved from positions facing the first and second light sources 2A and 2B toward the first and second extension parts 31*a* and 35*a*.

Further, the shape of the first and second light guide parts 31 and 35 is not particularly limited to such a shape and can be appropriately changed according to a design or the like of the vehicle. For example, it is possible to appropriately change the shape of the first and second curved parts 31*b* and 35*b* from the first and second light sources 2A and 2B to the first and second extension parts 31*a* and 35*a* according to places or directions of the first and second light sources 2A and 2B (the light source unit 20) disposed in the lighting body 10.

The first incidence part 32 has a flat (planar) first incidence surface 32*a* facing the first light source 2A, and causes the first light L1 emitted from the first light source 2A to enter the first light guide part 31 from the first incidence surface 32*a*. Accordingly, the first light L1 entering from the first incidence part 32 is guided toward the tip side of the first light guide part 31 while repeating reflection in the first light guide part 31.

The second incidence part 36 has a flat (planar) second incidence surface 36*a* facing the second light source 2B, and causes the second light L2 emitted from the second light source 2B to enter the second light guide part 35 from the second incidence surface 36*a*. Accordingly, the second light L2 entering from the second incidence part 36 is guided toward the tip side of the second light guide part 35 while repeating reflection in the second light guide part 35.

Further, the first and second incidence parts 32 and 36 are not particularly limited to the configuration having the above-mentioned flat (planar) first and second incidence surfaces 32*a* and 36*a*, but for example, may have a configuration having a lens shape of causing the first and second light L1 and L2 radially emitted from the first and second light sources 2A and 2B to enter the first and second light guide parts 31 and 35 while parallelizing or condensing the light.

The first reflection part 33 has a plurality of first reflection cuts 33*a* on a back surface side of the first extension part 31*a*, and the first light L1 guided into the first light guide part 31 is reflected toward the front surface side of the first extension part 31*a* by the plurality of first reflection cuts 33*a*.

The second reflection part 37 has a plurality of second reflection cuts 37*a* on the back surface side of the second extension part 35*a*, and the second light L2 guided into the second light guide part 35 is reflected toward the front surface side of the second extension part 35*a* by the plurality of second reflection cuts 37*a*.

The first and second reflection cuts 33*a* and 37*a* may be reflected at an angle where the first and second light L1 and L2 entering the back surface side of the first and second light guide parts 31 and 35 are emitted (transmitted) to the outside from the front surface side of the first and second light guide parts 31 and 35, and shapes, sizes or the number thereof are not particularly limited thereto.

In the embodiment, for example, the first and second reflection cuts 33*a* and 37*a* having a substantially triangular cross section obtained by cutting out the back surface side of the first and second light guide parts 31 and 35 in a vertical direction perpendicular to the axial direction of the first and second light guide parts 31 and 35 (in the embodiment, the upward/downward direction) are arranged in the axial direction of the first and second light guide parts 31 and 35 (in the embodiment, the rightward/leftward direction).

In addition, in the embodiment, the adjacent intervals of the first and second reflection cuts 33*a* and 37*a* are equal. Meanwhile, since the first and second reflection cuts 33*a* and 37*a* cause the first and second emission parts 34 and 38 (to be described below) to emit light more uniformly, the adjacent intervals of the first and second reflection cuts 33*a* and 37*a* may be gradually reduced from the base end side toward the tip side of the first and second light guide parts 31 and 35, or a depth of a groove portion that forms the first and second reflection cuts 33*a* and 37*a* may be gradually increased.

Further, a pair of reflecting surfaces (not shown) cutout in an arc shape on both sides that sandwich the plurality of first and second reflection cuts 33*a* and 37*a* in the vertical cross section may be provided on the back surface side of the first and second extension parts 31*a* and 35*a* to extend in the axial direction of the first and second light guide parts 31 and 35.

The first emission part 34 has a first emission surface 34*a* formed on a front surface side of the first extension part 31*a* in a convex shape curved in a substantially arc-shaped cross section. The first emission part 34 emits light in a line shape by emitting the first light L1 from the first emission surface 34*a* to the outside of the first light guide part 31.

The second emission part 38 has a second emission surface 38*a* formed on a front surface side of the second extension part 35*a* in a convex shape curved in a substantially arc-shaped cross section. The second emission part 38 emits light in a line shape by emitting the second light L2 from the second emission surface 38*a* to the outside of the second light guide part 35.

Further, a plurality of diffusion cuts (not shown) configured to diffuse the first and second light L1 and L2 emitted from the first and second emission surfaces 34*a* and 38*a* may be provided on the front surface side of the first and second extension parts 31*a* and 35*a*.

As the diffusion cut, for example, a concavo-convex structure or the like formed by performing lens cut referred to as flute cut or fisheye cut, knurling, embossing, or the like, will be exemplified.

In addition, it is possible to control the diffusion level of the first and second light L1 and L2 emitted from the first and second emission surfaces 34*a* and 38*a* by adjusting the shape or the like of the diffusion cut. Further, another diffusion lens may be disposed on the front surface side of the first and second extension parts 31*a* and 35*a*. Incidentally, in the lighting tool for a vehicle 1 of the embodiment, the first light guide body 3A has a first branch part 41 branched off from the first curved part 31*b* (support running part) toward the tip side of the second light guide part 35, and a branch emission part 42 located on the tip side of the first branch part 41 and configured to emit some of the first light L1 guided into the first light guide part 31 to the outside of the first light guide part 31.

Meanwhile, the second light guide body 3B has a second branch part 43 branched off from the second curved part 35*b* (support running part) toward the base end side of the first light guide part 31, and a branch incidence part 44 located on the tip side of the second branch part 43 and configured to cause the first light L1 emitted from the branch emission part 42 to enter the second light guide part 35.

The first branch part 41 and the second branch part 43 are provided between the first curved part 31*b* and the second curved part 35*b* to be branched off in opposite directions. In addition, the branch emission part 42 and the branch incidence part 44 are disposed while facing each other.

The branch emission part 42 has a flat (planar) branch emission surface 42*a* facing the branch incidence part 44, and the first light L1 branched off via the first branch part 41 is emitted from the branch emission surface 42*a* to the outside of the first branch part 41.

The branch incidence part 44 has a flat (planar) branch incidence surface 44*a* facing the branch emission part 42, and causes the first light L1 emitted from the branch emission part 42 to enter the second branch part 43 from the branch incidence surface 44*a*.

Accordingly, the first light L1 entering from the second branch part 43 enters the second light guide part 35 via the second branch part 43 and is guided toward the tip side of the second light guide part 35 while repeating reflection in the second light guide part 35.

Accordingly, the first light L1 entering the second light guide part 35 is reflected by the second reflection part 37, and then, emitted from the second emission part 38 to the outside of the second light guide part 35.

Further, in the embodiment, while the facing intervals are provided such that the branch emission surface 42*a* and the branch incidence surface 44*a* are parallel to each other, in some cases, the branch emission surface 42*a* and the branch incidence surface 44*a* may be in contact with each other.

In addition, in the lighting tool for a vehicle 1 of the embodiment, the light source unit 20 has a shielding member 25 located on the front surface side of the first light source 2A and the second light source 2B and configured to shield light between the first light source 2A and the second light source 2B.

The shielding member 25 is constituted by a colored (for example, black) resin member, the first light L1 emitted from the first light source 2A toward the second incidence surface 36*a* (the second incidence part 36) is blocked, and the second light L2 emitted from the second light source 2B toward the first incidence surface 32*a* (the first incidence part 32) is blocked. Accordingly, the first and second light L1 and L2 emitted from the first and second light sources 2A and 2B adjacent to each other can be appropriately blocked therebetween.

Further, the shielding member 25 may have a configuration in which a hole portion through which the first and second light L1 and L2 emitted from the first and second light sources 2A and 2B pass is provided. In addition, the shielding member 25 may be disposed to partition a space between the first light guide part 31 and the second light guide part 35.

In the lighting tool for a vehicle 1 of the embodiment having the above-mentioned configuration, as shown in FIG. 4, by turning on the second light source 2B, the second light L2 emitted from the second light source 2B enters the second light guide part 35 from the second incidence surface 36*a* (the second incidence part 36) of the second light guide body 3B, and the second light L2 is guided toward the tip side of the second light guide part 35 while repeating reflection in the second light guide part 35. In addition, in the second extension part 35*a* of the second light guide part 35, the second light L2 reflected by the plurality of second reflection cuts 37*a* (the second reflection part 37) on the back surface side is emitted from the second emission surface 38*a* (the second emission part 38) on the front surface side to the outside of the second light guide part 35.

Accordingly, in the lighting tool for a vehicle 1 of the embodiment, as the tail lamp TLL, it is possible to emit red light from the second emission surface 38a (the second emission part 38) of the second light guide body 3B using the second light L2. Meanwhile, in the lighting tool for a vehicle 1 of the embodiment, as shown in FIG. 5, by turning on the first light source 2A, the first light L1 emitted from the first light source 2A enters the first light guide part 31 from the first incidence surface 32a (the first incidence part 32) of the first light guide body 3A, and the first light L1 is guided toward the tip side of the first light guide part 31 while repeating reflection in the first light guide part 31. In addition, in the first extension part 31a of the first light guide part 31, the first light L1 reflected by the plurality of first reflection cuts 33a (the first reflection part 33) on the back surface side is emitted from the first emission surface 34a (the first emission part 34) on the front surface side to the outside of the first light guide part 31.

In addition, some of the first light L1 guided in the first curved part 31b (support running part) enters the first branch part 41 branched off from the first curved part 31b (support running part), enters from the branch incidence surface 44a (the branch incidence part 44) of the second branch part 43 branched off from the second curved part 35b (support running part) after emitted from the branch emission surface 42a (the branch emission part 42), and enters the second light guide part 35.

The first light L1 entering the second light guide part 35 is reflected by the plurality of second reflection cuts 37a (the second reflection part 37) on the back surface side in the second extension part 35a of the second light guide part 35 while being guided toward the tip side of the second light guide part 35, and then, emitted from the second emission surface 38a (the second emission part 38) of the front surface side to the outside of the second light guide part 35.

Accordingly, in the lighting tool for a vehicle 1 of the embodiment, as the brake lamp BRL, the first emission surface 34a (the first emission part 34) of the first light guide body 3A and the second emission surface 38a (the second emission part 38) of the second light guide body 3B can emit red light using the first light L1.

In addition, in the lighting tool for a vehicle 1 of the embodiment, by turning on the first light source 2A and the second light source 2B, as the brake lamp BRL, the first emission surface 34a (the first emission part 34) of the first light guide body 3A and the second emission surface 38a (the second emission part 38) of the second light guide body 3B can emit red light using the first light L1 and the second L2

As described above, in the lighting tool for a vehicle 1 of the embodiment, when the brake lamp BRL is turned on, by guiding some of the first light L1 guided by the first light guide body 3A to the second light guide body 3B, the first emission surface 34a (the first emission part 34) of the first light guide body 3A and the second emission surface 38a (the second emission part 38) of the second light guide body 3B emit red light, and thus, it is possible to satisfy the legal light emitting area of the brake lamp BRL.

In addition, in the lighting tool for a vehicle 1 of the embodiment, when the tail lamp TLL is turned on, only the second emission surface 38a (the second emission part 38) of the second light guide body 3B can emit red light by guiding the second light L2 on only the second light guide body 3B without emitting light from the first emission surface 34a (the first emission part 34) of the first light guide body 3A, and it is possible to improve appearance when the tail lamp TLL is turned on.

Further, the present invention is not particularly limited to the embodiment and various modifications may be made without departing from the scope of the present invention.

Specifically, in the lighting tool for a vehicle 1, it is not particularly limited to the configuration in which the first branch part 41 and the second branch part 43 are provided, but for example, as shown in FIG. 6, a configuration in which the first branch part 41 is omitted, the branch emission surface 42a (the branch emission part 42) is provided on the first curved part 31b (support running part), and the second branch part 43 extends to a position where the branch incidence surface 44a (the branch incidence part 44) faces the branch emission surface 42a (the branch emission part 42) may be provided.

Meanwhile, as shown in FIG. 7, a configuration in which the second branch part 43 is omitted, the branch incidence surface 44a (the branch incidence part 44) is provided on the second curved part 35b (support running part), and the first branch part 41 extends to a position where the branch emission surface 42a (the branch emission part 42) faces the branch incidence surface 44a (the branch incidence part 44) may be provided.

In addition, in the lighting tool for a vehicle 1, while the configuration in which a portion where the branch emission surface 42a (the branch emission part 42) and the branch incidence surface 44a (the branch incidence part 44) face each other is provided on at least one place, a configuration in which such portions are provided at two places or more (a plurality of places) in the first and second curved parts 31b and 35b (support running part) may also be provided.

Further, in the lighting tool for a vehicle 1 of the embodiment, in addition to the first and second light sources 2A and 2B that constitute the light source unit 20, or the first and second light guide bodies 3A and 3B that constitute the light guide part 30, for example, combination with another member such as a separate inner lens, reflector, extension, or the like, is also possible.

Further, in the embodiment, while the configuration of causing the tail lamp TLL and the brake lamp BRL to emit light has been exemplified as the lighting tools for a vehicle 1 mounted on both corner portions on the rear end side of the vehicle, the present invention may also be applied to a configuration of causing a tail lamp, a turn lamp of blinking orange light or a back lamp of emitting white light to emit light.

In addition, as the lighting tools for a vehicle mounted on both corner portions on the front end side of the vehicle, the present invention may also be applied to a configuration of causing a position lamp of emitting white light or a daytime running lamp (DRL) and a turn lamp to emit light.

In addition, the plurality of light emitting elements 24a and 24b including the light source unit 20 can use the light emitting element such as a laser diode (LD) or the like, in addition to the above-mentioned LED. In addition, the color of the light emitted from the light emitting element can also be changed as appropriate, such as white light, red light, orange light, or the like, depending on the application.

Further, the present invention is also applicable to, for example, an indoor lighting for a vehicle, an accessory lamp, or the like, in addition to the above-mentioned lighting tool for a vehicle.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle comprising:
a first light source and a second light source;
a first light guide body configured to guide first light emitted from the first light source; and
a second light guide body configured to guide second light emitted from the second light source,
wherein the first light guide body has a rod-shaped first light guide part, a first incidence part and a branch emission part, the first incidence part being located on a base end side of the first light guide part and being configured to cause the first light emitted from the first light source to enter the first light guide part, the branch emission part being configured to emit some of the first light, which is guided in the first light guide part, to an outside of the first light guide part, and
the second light guide body has a rod-shaped second light guide part, a second incidence part and a branch incidence part, the second incidence part being located on a base end side of the second light guide part and being configured to cause the second light emitted from the second light source to enter the second light guide part, the branch incidence part being configured to cause the first light, which is emitted from the branch emission part, to enter the second light guide part.

2. The lighting tool for a vehicle according to claim 1, wherein the first light guide body has a first branch part branched off from the first light guide part toward a tip side of the second light guide part, and
the branch emission part is located on a tip side of the first branch part.

3. The lighting tool for a vehicle according to claim 1, wherein the second light guide body has a second branch part branched off from the second light guide part toward a base end side of the first light guide part, and
the branch incidence part is located on a tip side of the second branch part.

4. The lighting tool for a vehicle according to claim 1, wherein the branch emission part and the branch incidence part are disposed to face each other.

5. The lighting tool for a vehicle according to claim 1, wherein the first light source and the second light source are provided on a same surface of a same substrate, and emit the first light and the second light in the same direction.

6. The lighting tool for a vehicle according to claim 5, comprising a shielding member that is provided between the first light source and the second light source and that is configured to shield light between the first light source and the second light source.

7. The lighting tool for a vehicle according to claim 1, wherein the first light guide body has a first reflection part and a first emission part, the first reflection part being located on a back surface side of the first light guide part and being configured to reflect first light, which is guided toward the tip side of the first light guide part, toward a front surface side of the first light guide part, the first emission part being located on the front surface side of the first light guide part and being configured to emit the first light reflected by the first reflection part to the outside of the first light guide part,
wherein the second light guide body has a second reflection part and a second emission part, the second reflection part being located on a back surface side of the second light guide part and being configured to reflect second light, which is guided toward a tip side of the second light guide part, toward a front surface side of the second light guide part, the second emission part being located on the front surface side of the second light guide part and being configured to emit the second light reflected by the second reflection part to an outside of the second light guide part, and
wherein the first light that has entered the second light guide body from the branch incidence part is reflected by the second reflection part and then emitted from the second emission part to the outside of the second light guide part.

8. The lighting tool for a vehicle according to claim 7, wherein a state in which red light is emitted from the first emission part and the second emission part as a tail lamp by turning on the second light source is switched to a state in which red light is emitted from the first emission part and the second emission part as a stop lamp by turning on the first light source.

9. The lighting tool for a vehicle according to claim 7, wherein a state in which red light is emitted from the second emission part as a tail lamp by turning on the second light source is switched to a state in which red light is emitted from the first emission part and the second emission part as a stop lamp by turning on the first light source and the second light source.

* * * * *